March 17, 1925. 1,529,997
H. HOWARD
APPARATUS FOR THE ABSORPTION OF GASES IN LIQUIDS
Filed Dec. 15, 1922  2 Sheets-Sheet 1

Inventor
Henry Howard
By Byrnes Townsend & Brickenstein
Attorneys

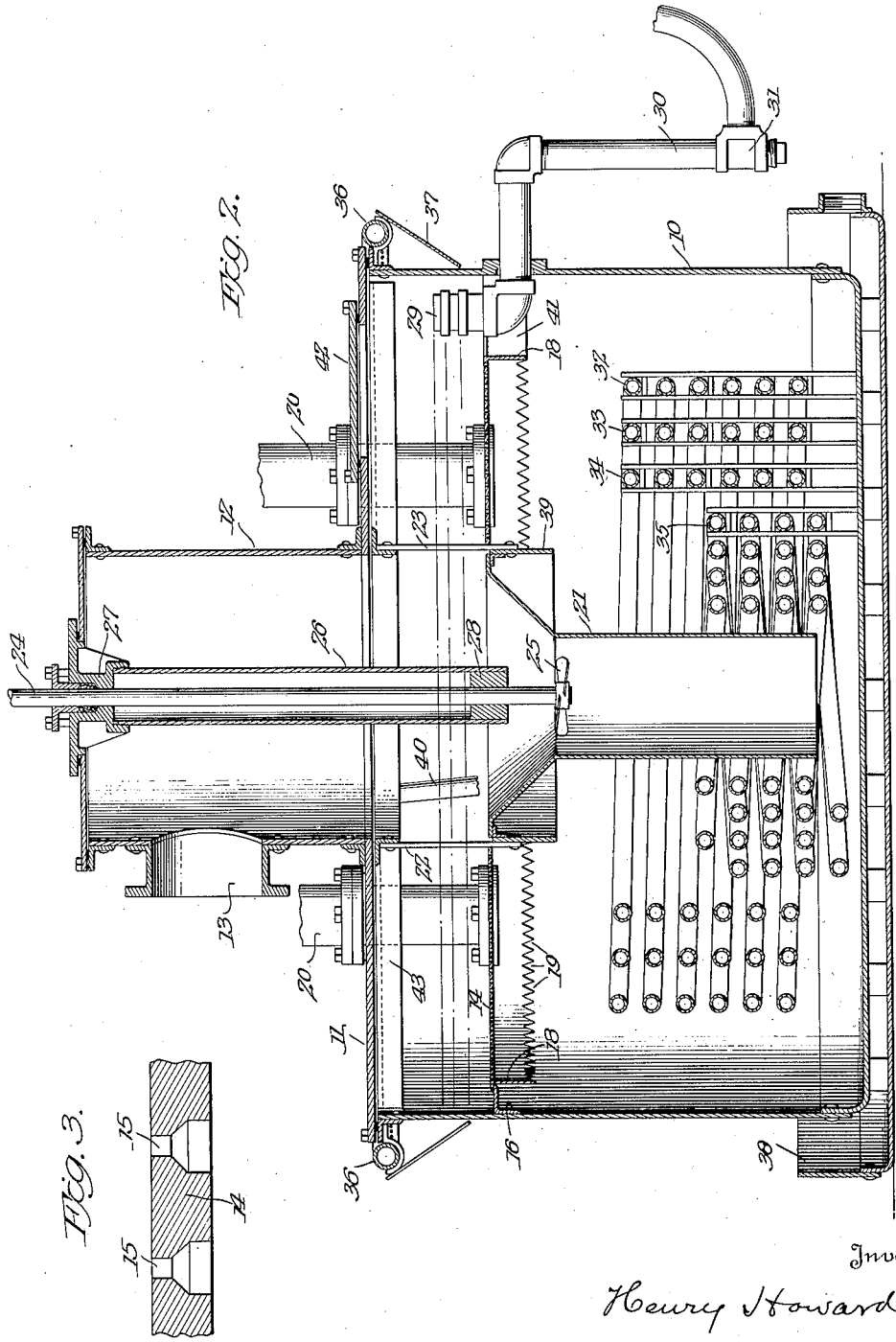

Patented Mar. 17, 1925.

1,529,997

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

APPARATUS FOR THE ABSORPTION OF GASES IN LIQUIDS.

Application filed December 15, 1922. Serial No. 607,202.

*To all whom it may concern:*

Be it known that I, HENRY HOWARD, a citizen of the United States, residing at Cleveland, in the county of Cuyahoga and State of Ohio, have invented certain new and useful Improvements in Apparatus for the Absorption of Gases in Liquids, of which the following is a specification.

This invention relates to apparatus for the impregnation of liquids with gases or the absorption of gases in liquids and relates more particularly to the absorption of sulfuric anhydrid as a step in the process of making sulfuric acid.

In its more specific aspect the invention relates more particularly to what are commonly referred to in the art as "oleum absorbers."

It is the general object of the invention to provide an apparatus of the character mentioned which is simple in construction and operation and is highly efficient in its function of causing the absorption of the gases in the liquid.

The principal points of novelty include means for introducing the gas into the body of the absorbing liquid in the form of minute bubbles and means for promoting the rate of absorption.

For a full understanding of the principles on which the invention is based and the mode of operation for carrying it out, reference is made to the accompanying drawings in which—

Fig. 2 is a vertical section thereof; and

Fig. 3 is a fragmentary section of a detail.

Figure 1:
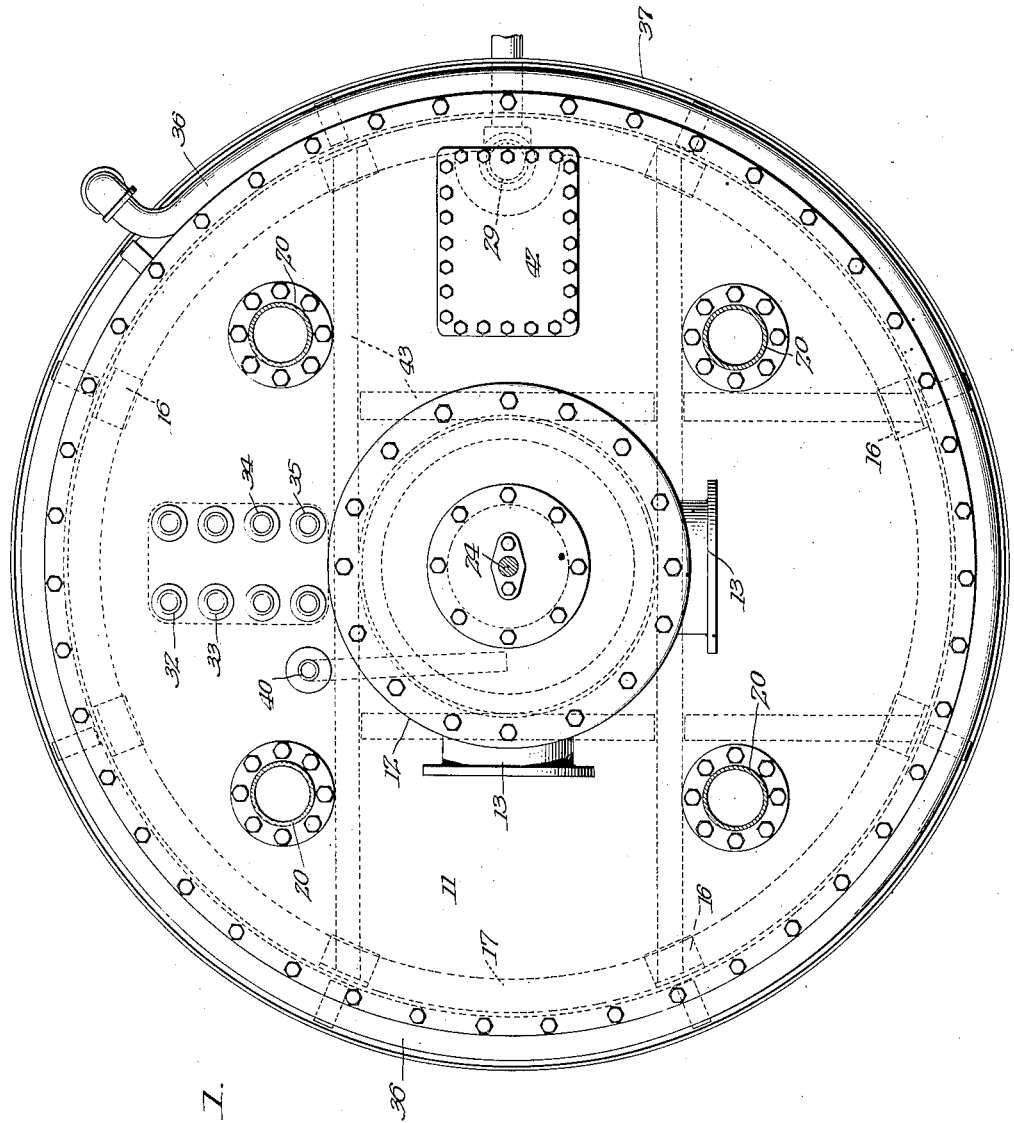
Fig. 1 is a plan view of an apparatus embodying the invention.

Having reference to the drawings 10 represents a preferably cylindrical container constituting the absorption chamber, 11 the cover therefor and 12 a central flue for conducting away the gases not absorbed in the liquid, 13 being the gas outlet.

Within the absorption chamber and transversely thereof is mounted a plate 14 having a large number of perforations 15 preferably formed as shown in detail in Fig. 3. In an apparatus constructed according to the invention, the plate 14 has been provided with 17,653 perforations representing an aggregate area approximately 338 square inches, thus providing an enormous surface for absorption. While there is considerable latitude in regard to the size of the perforations and their spacing, I have found that a diameter of $\frac{5}{32}''$ and a spacing of $\frac{5}{8}''$ from center to center have given good satisfaction and may be considered as a fair working example. The plate 14 may be supported upon lugs 16 spaced along the wall of the chamber 10, leaving a substantially annular space 17 between its edge and the wall for a purpose to be more fully pointed out. From the marginal portion of the plate 14 depends a substantially cylindrical curtain 18 provided in its free edge with serrations 19.

The serrated edge of the curtain 18 is provided to constitute a makeshift in case the perforations become clogged up. In such case the gas is broken up into individual bubbles by the serrations and passes upwardly through the stream descending adjacent the walls of the chamber.

The gas is introduced into the chamber by pipes 20 extending through the plate 14 and terminating at its lower surface. As indicated in Fig. 2, the pipes 20 are preferably bolted to the cover and the plate 14 affording a rigid support of the latter.

In the drawing I have indicated four intake pipes, but any other number may be used depending on the size of the apparatus, the object being to effect a good distribution of the gas in the chamber.

The central part of the plate 14 has a large opening taken up by the upper portion of a tube 21 which is preferably cone shaped at its upper end. This tube is supported by a frame 22 bolted to an angle frame 43 on the cover 11. The frame 22 defines lateral openings 23.

Centrally through the cover of the flue 12 extends a shaft 24 carrying at its lower end a propeller 25. The shaft 24 is surrounded by a sleeve 26 secured in a packing gland 27 for the shaft and serves the purpose of supporting the lower bearing and screening the gas away from the gland, a plug 28 in the lower end of the sleeve serving as a bearing for the shaft. This arrangement has particular advantages in connection with sulfur trioxide or other acid gases or otherwise injurious gases.

As indicated in Fig. 2 an overflow 29 is provided for carrying off the impregnated liquid. The overflow may comprise a plurality of sections for adjusting it to any desired level. In an apparatus for the absorption of sulfur trioxide, for the production of oleum the overflow pipe 30 is provided with a trap 31 to prevent the escape of gas. The absorbent liquid is introduced through pipe 40, which extends below the liquid level.

Within the body of the tank 10 are located a number of cooling coils 32, 33, 34, 35 through which a cooling fluid is passed, inlet and exit pipes passing, as shown in Fig. 1, through the cover 11.

In order to still further cool the liquid within the chamber, I provide an external spray 36 extending around the casing 10 and directed against the same, preferably supplemented by an apron 37 approaching the casing in the shape of a funnel. A tank 38 is provided for collecting and draining off the spray liquid.

In order to prevent the escape of gas where the intakes and returns for the pipes 32, 33, 34 and 35 and the overflow pass through the gas space below plate 14, suitable provisions may be made, such as aprons or curtains 41 extending downwardly from the plate to a depth beyond the gas space formed during the normal operation. A curtain 39 extends downwardly from the inner edge of the plate 14 to prevent the escape of gas upwardly through the flue 12. This curtain is connected to the frame 22 and supports the tube 21. The curtains need extend only a short distance beyond the serrated edge of the curtain 18.

It will be observed that the plate 14, the gas inlet conduits 20, the tubular element 21, the coils 32—35, pipe 40, and the propeller are removable as a unitary structure with the cover 11.

A manhole 42 may be provided in the cover to afford access to the interior without taking off the cover.

The operation is as follows:

The chamber is filled with absorbent liquid, such as oleum containing approximately 10 to 40% free $SO_3$ to a level above the plate 14. The gas enters into the space below the plate 14 and passes upwardly through perforations 15 through the liquid above it. The propeller 25 forces a continuous stream of the liquid preferably upwardly and the liquid flows outwardly over the perforated plate 14 and downwardly between the edge of the plate and the wall of the chamber. The gas is released from the upper end of the perforations as a multitude of minute bubbles, tending to pass upwardly through the liquid. An enormous surface of contact between the liquid and gas is thus provided, and where $SO_3$ gas is being absorbed, unless some means are provided for circulating and cooling, the acid acting as absorbent would quickly become heated and over strength on top of the large flat plate, thereby checking the rate of absorption.

The central propeller, however, causes the absorbent liquid in the central pipe to flow upward and outward over the perforated plate towards the periphery and then downwardly in contact with the outer shell of the absorber, which is cooled by the water spray, and then over the large cooling surfaces of the coils to the bottom of the circulating pipe 21.

Thus the gas is presented to the liquid in a form in which it is most readily absorbed and the liquid is maintained in a condition in which it most readily absorbs the gas. The cooperation of these two features marks the principal feature of the invention. It is obvious that the apparatus would still operate if the direction of the propeller were reversed, thereby producing a down flow in the central pipe and upwardly through the cooling coils, etc. The operation will not be as efficient however, as when the circulation goes in the preferred direction because of probably short cutting of the rising warm acid in channels which is automatically stopped when the hot acid is forced downwardly over the cooling surfaces.

While the construction disclosed and described constitutes what I consider as a particularly advantageous and preferred embodiment of the invention, it is obvious that within the broader aspects thereof various changes may be made.

I claim:

1. An apparatus for absorbing a gas in a liquid comprising a tank, a plate therein having multitudinous small perforations, means for introducing gas beneath the plate, means for continuously circulating the absorbing liquid over the plate, and means for continuously removing heat from the absorbing liquid while it is being recirculated.

2. An apparatus for absorbing a gas in a liquid comprising a tank, a plate therein having multitudinous small perforations, means for introducing gas beneath the plate, cooling coils within the tank and means for continuously circulating the absorbent liquid over the plate and the coils.

3. Apparatus for absorbing a gas in a liquid, comprising a closed chamber, a plate provided with multitudinous small perforations and extending transversely of the chamber intermediate the top and bottom thereof, the plate having a central opening and being peripherally spaced from the wall of the chamber to define a communication between the space above the plate and the space below the plate, a tubular element extending downwardly from the edge of the plate defined by its central opening, means for causing a flow of liquid from the space below the plate over the upper surface of the plate, means for passing a gas into the chamber to points immediately below the plate, the chamber being normally filled with a liquid to a level above the plate, and cooling coils below the plate.

4. Apparatus for absorbing a gas in a liquid, comprising a closed chamber, a plate provided for multitudinous small perforations and extending transversely of the chamber intermediate the top and bottom thereof, the plate having a central opening and being peripherally spaced from the wall of the chamber to define a communication between the space above the plate and the space below the plate, a tubular element extending downwardly from the edge of the plate defined by its central opening, means for causing a flow of liquid from the space below the plate over the upper surface of the plate, means for passing a gas into the chamber to points immediately below the plate and a curtain extending downwardly from the peripheral edge of the plate for confining the gas against lateral flow, the chamber being normally filled with a liquid to a level above the plate, and cooling coils below the plate.

5. Apparatus according to claim 4 in which the free edge of the gas-confining means mentioned is provided with serrations.

6. Apparatus according to claim 3 including an overflow pipe extending upwardly through an opening in the plate and detached therefrom and constructed to be adjustable for different levels.

7. Apparatus according to claim 4 including an overflow above the plate, the intakes and returns of the cooling coils and the overflow extending through the plate, and curtains extending downwardly from the plate about said pipes and overflow to a level below the level of the lower edge of said gas-confining means to limit the lateral flow of gas.

8. Apparatus according to claim 3 including a pipe for feeding liquid into the chamber at a point adjacent to the means for causing the flow of the liquid.

9. Apparatus according to claim 3 including means for cooling the walls of the chamber above the level of the plate.

10. Apparatus for impregnating a liquid with a gas, comprising a tank, a cover therefor, a perforated plate disposed transversely of the tank and spaced from the walls thereof to define a communication between the space above and the space below it, gas inlet conduits passing through the cover down through the plate and terminating at the lower surface thereof, cooling pipes below the plate, the inlets and returns of which pass through the cover and the plate, and means for connecting the plate, the gas conduits and the cooling pipes with the cover to be removable therewith as a single mechanical unit.

11. In apparatus for impregnating a liquid with a gas, an absorption chamber, a plate disposed transversely in the chamber, means on the plate defining a gas space immediately below it, cooling coils below the plate the inlets and returns of which pass through the plate, and curtains extending from the plate around the pipes to isolate the zone immediately about the pipes from the said gas space.

12. In apparatus for impregnating a liquid with a gas, an absorption chamber, a plate disposed transversely in the chamber, means on the plate defining a gas space immediately below it, an overflow pipe extending upwardly through the plate to a level above it, and a curtain depending from the edge of the opening in the plate through which the pipe passes for isolating the opening from the gas space.

13. Apparatus for contacting a gas with a liquid comprising a tank, a plate positioned horizontally in said tank, said plate having multitudinous small perforations, means for introducing gas beneath the plate, and means for maintaining a horizontally flowing layer of liquid upon said plate.

In testimony whereof, I affix my signature.

HENRY HOWARD.